J. H. CRIST & J. C. SCHILKEN.
BRACKET.
APPLICATION FILED MAY 1, 1915.
1,179,166. Patented Apr. 11, 1916.
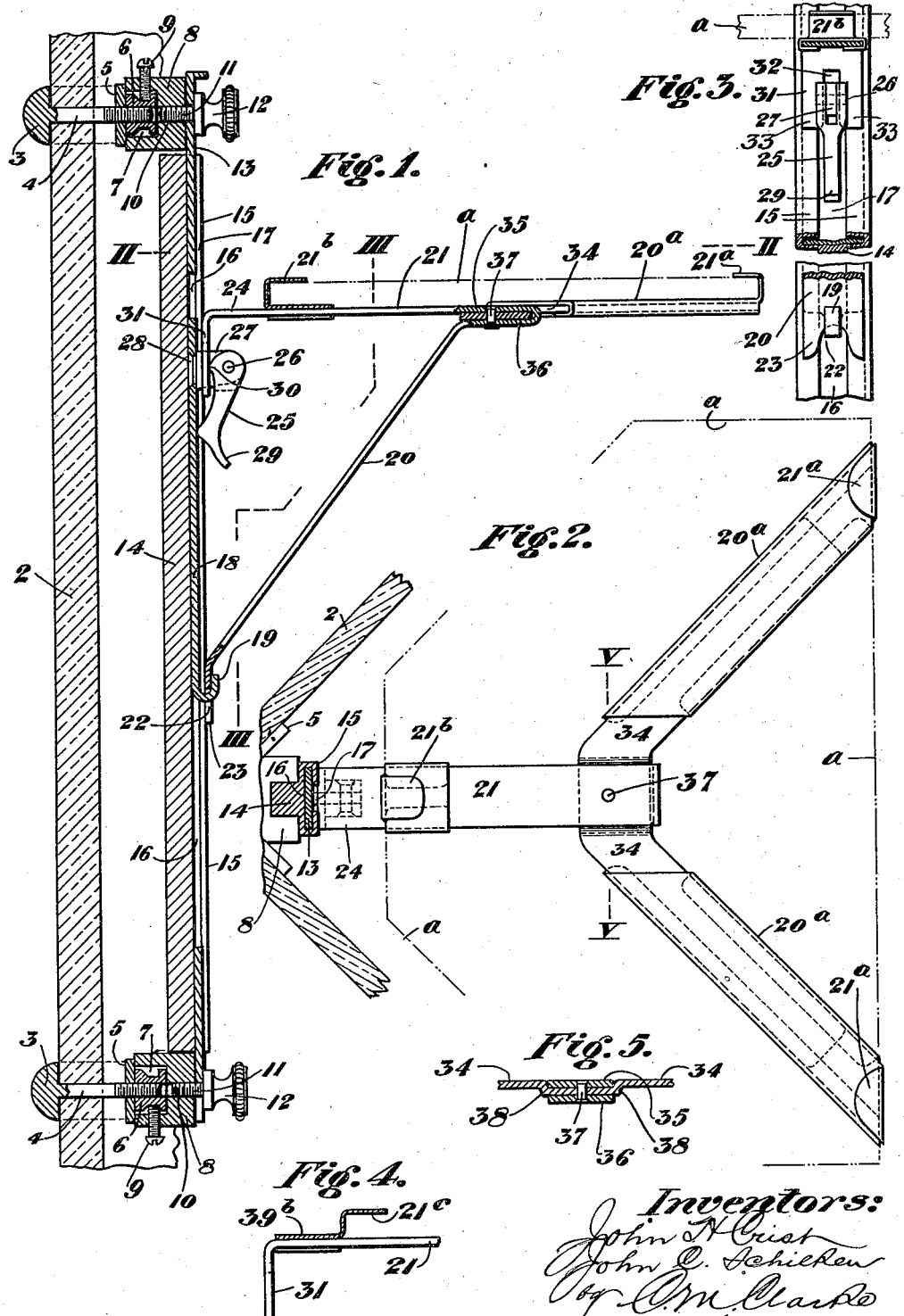
Inventors:
John H. Crist
John C. Schilken
by O. M. Clarke
their attorney

UNITED STATES PATENT OFFICE.

JOHN H. CRIST, OF OAKMONT, AND JOHN C. SCHILKEN, OF PITTSBURGH, PENNSYLVANIA.

BRACKET.

1,179,166. Specification of Letters Patent. Patented Apr. 11, 1916.

Application filed May 1, 1915. Serial No. 25,144.

*To all whom it may concern:*

Be it known that we, JOHN H. CRIST and JOHN C. SCHILKEN, citizens of the United States, residing at Oakmont and Pittsburgh, respectively, in the county of Allegheny and State of Pennsylvania, have invented certain new and useful Improvements in Brackets, of which the following is a specification.

Our invention consists of an improvement in bracket construction adapted to be used with plate or other glass window fronts of stores or the like, or in connection with any suitable wall or other supporting structure.

It has in view to provide a bracket or shelf-supporting construction, adapted to be mounted on a main supporting bar at any desired position, and preferably in connection with a support like that shown in a companion application filed herewith, having the Serial Number 25,143, May 1, 1915.

The bracket is designed for supporting a shelf of plate glass or other suitable material, and is provided with means for securing it in desired position on its supporting standard, and has a plurality of supporting arms or bearings, preferably adjustable, adapted to positively hold the shelf, and is constructed and adapted to be operated in the manner more fully hereinafter described.

The present invention is an improvement on a bracket construction forming the subject matter of prior application of John H. Crist, Serial No. 867278.

Preferred forms of the invention are shown in the accompanying drawings, in which—

Figure 1 is a vertical sectional view, showing one form of the bracket as applied to the corner connecting elements of a plate glass window. Fig. 2 is a transverse sectional view, indicated by the line II. II. of Fig. 1. Fig. 3 is a vertical sectional detail view, indicated by the line III. III. of Fig. 1. Fig. 4 is a sectional detail view showing a modified construction of shelf retaining clip. Fig. 5 is a cross sectional detail view taken on the line V. V. of Fig. 2.

The bracket construction is illustrated in connection with one form of supporting bar in which the invention is illustrated as used in connection with a plate glass window, although it will be understood that any suitable support may be used, and such support is shown and described for illustration only. Referring thereto, the lights 2, 2, are ordinarily arranged at or approximately at right angles to each other, more or less, or any one of the standard constructions used in such work, connected at their angular juncture, at vertically separated positions, by means of an outer angular bracket clip 3, adapted to embrace each edge portion of the adjacent plates. Said bracket is provided with an integral bolt 4 extending inwardly through the plates at their juncture, and on the inside of the plates is an interfitting angular bracket 5, preferably of plate metal. The inner end of bolt 4 is threaded, as shown, and provided with a tightening thumb nut 6 having an undercut groove 7.

For the purpose of providing attaching means for the vertical bracket supporting member, we use a thimble 8, in the form of a stud, having a cylindrical opening at one end adapted to fit over the nut 6, and provided with a securing set screw 9 for tightening engagement, which is tightly screwed into the annular recess 7 of nut 6. By this means the thimble stud 8 is fixedly secured in position, and extends inwardly beyond the said nut to any desired extent. Nut 8 is also provided with a centrally arranged threaded socket 10, into which is screwed the threaded stem 11 of a securing thumb head 12, as clearly shown. Between the body portion of said head 12 and stud 8 is inserted the connecting plate or bar 13, of any desired length and width, one or both ends of which may extend vertically beyond the stud 8, for engagement with the main supporting bar 14. Bar 14 is of sufficiently heavy cross sectional body, by means of its rear rib, to provide the necessary stiffness and strength, although any other construction may be substituted which will provide for the mounting of the bracket.

The front portion of bar 14 is formed to provide the laterally extending retaining lip sections 15, 15, at each side of an interior cavity 16, and providing the intervening slot 17 for attachment of the bracket-holding member. Said bracket-holding member consists of a plate or bar 18, of a cross sectional width and thickness to freely fit and slide within the longitudinal cavity 16, and of a length adapted to provide ample bracing support for the attached bracket. Bar 18, in the construction shown, is provided at one end with an attaching hook or terminal abutment 19, with which the leg 20 of the bracket 21 engages by a central notch 22 between the extended retaining lips 23.

For the purpose of fixedly securing the slidable plate or bar 18, and also the upper bar 24 of the bracket in position at any point, we provide the cam locking device 25. Said device is pivoted at 26, at each side of an outwardly extending bearing stud 27, which is secured to plate 18 by riveting or otherwise, as indicated at 28. The locking arm 25 is provided with an operating terminal 29 and a locking cam lug 30. Bracket 24 extends downwardly by a terminal 31, which is centrally slotted, and embraces stud 27 at each side, as clearly shown, and is thus located underneath and in the path of action of cam portion 30. By this means, upon turning the cam to the position shown in Fig. 1, the parts are fixedly clamped together, and upon turning the cam upwardly, they are released, so that the bracket may be lifted upwardly and removed, and the plate 18 may be adjusted to any desired position vertically.

The bracket 21 is provided with the main upper horizontal member 24 and the lower inclined bracing member 20, formed of a continuous piece or strip of thin flat metal. The lower end of brace 20 is constructed as above described for interengagement with the terminal hook 19. The inner end of top member 24 is turned down at right angles, providing the lip terminal 31 having the central slot 32 between the side members 33. By this construction terminal 31 is adapted to be inserted over stud 27 of the holding device, and at the same time the lower end of brace 20, by a slot 22 and cheeks 23, is connected with hook terminal 19. Eccentric or cam locking device 25, when adjusted to the position shown in Fig. 1, will therefore hold the bracket in fixed relation to the standard, by clamping terminal 31 and plate 18 tightly against the intervening standard flanges 15, 15.

The outer portion of the bracket is composed of a supplemental V-shaped plate 34 which is secured between the upper and lower outer doubled portions 35, 36, of the main bracket and fixedly held by a rivet 37. The joint is rendered immovable, and the surfaces of member 31 and arm 21 are brought to a common level or plane by offsetting the angle plate 34 at each edge of member 21, as indicated at 38. The outer terminal portions of arm members 34 are provided with the telescoping extension members 20ª having the upwardly and inwardly turned retaining lip terminals 21ª, for engagement against the end and upper surface of the supporting bracket $a$, indicated in dotted lines. Telescoping extension 20ª is fitted around arm 34, at each side, with a sufficient degree of frictional engagement so as to hold its position in engagement with the inner edge and upper surface of the shelf $a$ in the same manner.

In Fig. 4 we have shown a modified construction of the inner holding clip 21ᶜ, its body portion 39ᵇ being extended backwardly, instead of forwardly, and folded around the bar 21 for frictional sliding engagement therewith. By this construction, clip 21ᶜ can be pushed backwardly only until the rear portion of the ferrule member 39ᵇ engages against the leg 31, thereby effectually holding the inner edge of the shelf outwardly from the adjacent framing and window plate members an appreciable distance.

The shelf $a$ may be of plate glass or of any other suitable or desired material. The bracket itself may be used either with or without the shelf, and the terminals may be utilized for hanging various articles, as neckties, hosiery, etc., upon them.

The invention is not limited to application to the corner of a window, as it may as readily be used in connection with the intervening frame of two adjacent lights on the same plane, or within display or show cases, or against a wall or other surface.

The advantages of the invention will be readily appreciated by all those familiar with this class of devices. It enables the easy and convenient attachment and detachment of the bracket; it provides for supporting shelves of various sizes, by adjustment of the holding terminal members; it is adapted for easy removal for cleaning; and it is substantial and durable in construction, economical to manufacture, and ornamental in appearance.

It will be understood that the invention may be variously changed or modified in construction, design, or other details by the skilled mechanic, but that all such changes are to be considered as within the scope of the following claims.

What we claim is:

1. A supporting bracket of the class described consisting of attaching members provided with slotted terminals and diverging shelf-supporting members, and telescoping extensions thereon having inwardly turned retaining lips.

2. A supporting bracket of the class described consisting of attaching members providing with slotted terminals and diverging shelf-supporting members, and telescoping extensions thereon having inwardly turned retaining lips and a supplemental movable holding device having a similar retaining lip mounted on one of the supporting members.

3. A bracket of the class described consisting of a formed strip having a doubled middle portion and terminal attaching portions, and an angular member embraced between the upper and lower members of the middle doubled portion and bent upwardly at each side thereof to conform to the same general level of the upper strip.

4. A bracket of the class described consisting of a formed strip having a doubled middle portion and terminal attaching portions, and an angular member embraced between the upper and lower members of the middle doubled portion and bent upwardly at each side thereof to conform to the same general level of the upper strip, said members being connected by a transverse rivet.

5. A bracket of the class described consisting of a formed strip shaped to provide a horizontal upper member and a lower inclined bracing member, each of said members having slotted attaching terminals, the formed strip having a doubled middle portion, an angular member embraced between the upper and lower members of said doubled portion, and telescoping extensions thereon having frictional sliding engagement therewith and provided with upwardly and backwardly turned retaining lip members.

6. The combination with the main strip providing the upper horizontal member and the brace member, each having slotted attaching terminals, said members being connected with diverging bracket arms provided with telescoping extensions, and an adjustable clip member slidably mounted on the main horizontal member of the bracket.

7. The combination with a supporting standard having a slotted cavity and a bar slidably mounted therein having a clamping device and a retaining abutment; of a supporting bracket provided with attaching terminals adapted to be engaged by said clamping device and abutment respectively.

8. The combination with a supporting standard having a slotted cavity and a bar slidably mounted therein having a stud extending through the slotted cavity, a retaining hook also extending through the slotted cavity, a cam pivoted on said stud, and a supporting bracket having attaching terminals adapted to be engaged by said cam and hook respectively.

9. The combination with a supporting standard having a slotted cavity and a bar slidably mounted therein having a stud extending through the slotted cavity, a retaining hook also extending through the slotted cavity, a cam pivoted on said stud, and a supporting bracket having slotted attaching terminals adapted to embrace said stud and hook respectively, and to be fixedly held by engagement of said cam with one of said terminals.

In testimony whereof we hereunto affix our signatures in the presence of two witnesses.

JOHN H. CRIST.
JOHN C. SCHILKEN.

Witnesses:
W. A. HECKMAN,
C. M. CLARKE.

Copies of this patent may be obtained for five cents each, by addressing the "Commissioner of Patents, Washington, D. C."